United States Patent [19]

Wojnarowski et al.

[11] Patent Number: 5,018,150

[45] Date of Patent: May 21, 1991

[54] REFLECTOR SWITCHED LASERS

[75] Inventors: Robert J. Wojnarowski, Ballston Lake; Charles W. Eichelberger, Schenectady, both of N.Y.

[73] Assignee: General Electric Company, Schenectady, N.Y.

[21] Appl. No.: 403,236

[22] Filed: Sep. 5, 1989

[51] Int. Cl.$^5$ .............................................. H01S 3/08
[52] U.S. Cl. ........................................ 372/9; 372/107
[58] Field of Search ................ 372/9, 15, 92, 14, 107, 372/99, 108, 26

[56] References Cited

U.S. PATENT DOCUMENTS 3,483,482 12/1969 Erickson ................................. 372/15
4,530,098 7/1985 Karaki ..................................... 372/9
4,847,854 7/1989 Van Dijk ............................... 372/107

Primary Examiner—James W. Davie
Attorney, Agent, or Firm—Marvin Snyder; James C. Davis, Jr.

[57] ABSTRACT

A laser capable of continuous wave operation is provided with a switching capability by including an electromagnetic transducer in its mirror adjustment system which is capable of moving the mirror sufficiently out of alignment ot interrupt laser action in the laser. In this manner, by switching the mirror between its aligned and misaligned conditions, the laser may be turned on and off without loss of output power and with pulse durations and duty cycles which are limited only by the ability of the electromagnetic transducer to move the mirror between its aligned and misaligned conditions. By providing separate transducers for both vertical and horizontal adjustment, alignment of the laser may be maintained electronically.

17 Claims, 7 Drawing Sheets

REFLECTOR SWITCHED LASERS

BACKGROUND OF THE INVENTION

1. Field of the Invention

The present invention relates to the field of lasers, and more particularly, to switched lasers.

2. Background Information

Many laser applications require that the laser beam be intermittent or pulsed. Such applications include laser milling where it is desired to move the workpiece relative to the laser beam while the laser beam is not impinging on the workpiece. Different applications require different duty cycles and on-durations of the laser.

A common technique for providing laser switching with a controllable duty cycle is the acousto/optical modulator (AO modulator). Acousto/optical modulators are relatively fast and are able to switch between on and off in about 20 nanoseconds. This is because the laser beam is on all the time and the acousto/optic modulator merely produces a first order diffraction of the beam in order to deflect a portion of the beam into an "on" beam path to turn the beam "on" in the external environment. High quality acousto/optic modulators are capable of on-to-off ratios of approximately 1,000:1 and thus allow some laser light through even in the off position. Less sophisticated acousto/optic modulators may have an on-to-off ratio of only about 100:1 with the result that a substantial quantity of light bleeds through even in the off state. However, the primary disadvantage of using an acousto/optic modulator for switching a laser is the fact that even the best acousto/optic modulators can only switch about 50% of the available laser light into the on-beam. Consequently, the laser must be able to provide an output power which is at least twice the power level required at the workpiece. Unfortunately, there are many applications where a power level between 1 and 3 watts is desired at a workpiece in the ultraviolet portion of the spectrum and the highest power, reliable, cost effective UV lasers which are available provide only 3.5 to 5 watts of laser power. In those situations, the acousto/optic modulator is not a satisfactory switch due to its losses of 50% or more. In general, losses of 50% are considered undesirable for all types of lasers, whether ion or not and whether argon, krypton, HeNe or $CO_2$ gas based or rod based.

A second alternative for switching a laser is a Q switch. In Q switching, the Q switch is placed within the laser cavity and comprises a cell which is opaque in the absence of an electrical signal, but which becomes substantially transparent upon application of an appropriate electrical signal to the cell. Q switches are used with ion lasers in which the atomic states of the lasing medium are excited, but no light output is provided because the Q switch attenuates any light traveling along the axis of the cavity to a level where multiple traversals of the cavity are prevented. Q switches are susceptible to crystal damage and cell damage at flux densities which are required for many applications. Thus, the use of Q switches in those applications is not desirable. Q switches for ultraviolet lasers are essentially unavailable due to crystal damage susceptibility. Additionally, in high power Q switched lasers, beam blooming can result from thermal instability in Q switch. When the Q switch is triggered to its clear condition by an electrical signal, the light of the laser passes through the Q switch, strikes the mirror at the end of the cavity and retraverses the Q switch, thereby turning the laser action on very rapidly. The laser light further clarifies the Q switch material with the result that an even higher Q is provided. In this situation, almost all of the laser medium is brought out of the excited state and a short, high energy pulse of laser light is provided. Unfortunately, Q switched lasers are restricted to low repetition rates, since the Q switch must return to an opaque condition following the removal of the electrical trigger signal in order to allow the lasing medium to recharge. Typically, Q switched lasers have a maximum repetition rate of about 1 KHz.

Other techniques, such as mechanical shutters and rotating disks with holes in them have been used to switch lasers. Unfortunately, for high repetition rates (in excess of about 10 KHz), such systems are subject to synchronization and wear-out problems. In addition, for high energy lasers, means must be provided to absorb the laser energy while the shutter is closed or the laser is impinging on an opaque portion of the disk.

In lasers such as ion lasers which have mirrors external to the cavity containing the lasing plasma, it is standard practice to provide mechanical adjusting screws for adjusting the mirror angle relative to the optical cavity axis in order to enable mechanical alignment of the optical system to provide maximum efficiency and energy output. This also enables the user to compensate for any changes in adjustment or alignment during shipping or over a period of time.

There is a need for a fast, reliable technique for switching lasers at frequencies from 1 KHz to 60 KHz or higher with controllable duty cycles.

OBJECTS OF THE INVENTION

Accordingly, a primary object of the present invention is to provide a mechanism for switching a laser between its on and off states with a controllable duty cycle.

A further object of the present invention is to provide a laser switching mechanism which provides the full laser power in the laser beam while in the on condition.

Still another object of the present invention is to provide a high repetition rate switching mechanism for a laser.

A further object of the present invention is to provide an electronic alignment mechanism for a reflector of a laser.

SUMMARY OF THE INVENTION

The foregoing and other objects which will become apparent from the specification as a whole, including the drawings, are accomplished in accordance with a preferred embodiment of the present invention by providing electronically controlled means for adjusting the alignment of one of the end mirrors of the laser cavity. The laser is turned on by adjusting that mirror into alignment with the optical axis of the laser cavity and the laser is turned off by adjusting that mirror out of alignment with that optical axis. This adjustment may be performed by a voice coil, a piezoelectric transducer, a solenoid, a motor driven cam or any other appropriate mechanism. In accordance with the invention, the lasing medium is maintained in an excited state independent of whether the reflector is aligned with the optical axis or not. Whenever the reflector is aligned with the optical axis, the laser commences lasing with a rise time on the order of about 5 nanoseconds and preferably remains on until turned off by adjustment of the mirror off the optical axis or interruption of the pumping mechanism which preferably maintains the lasing material in an excited state.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

Figure 1:
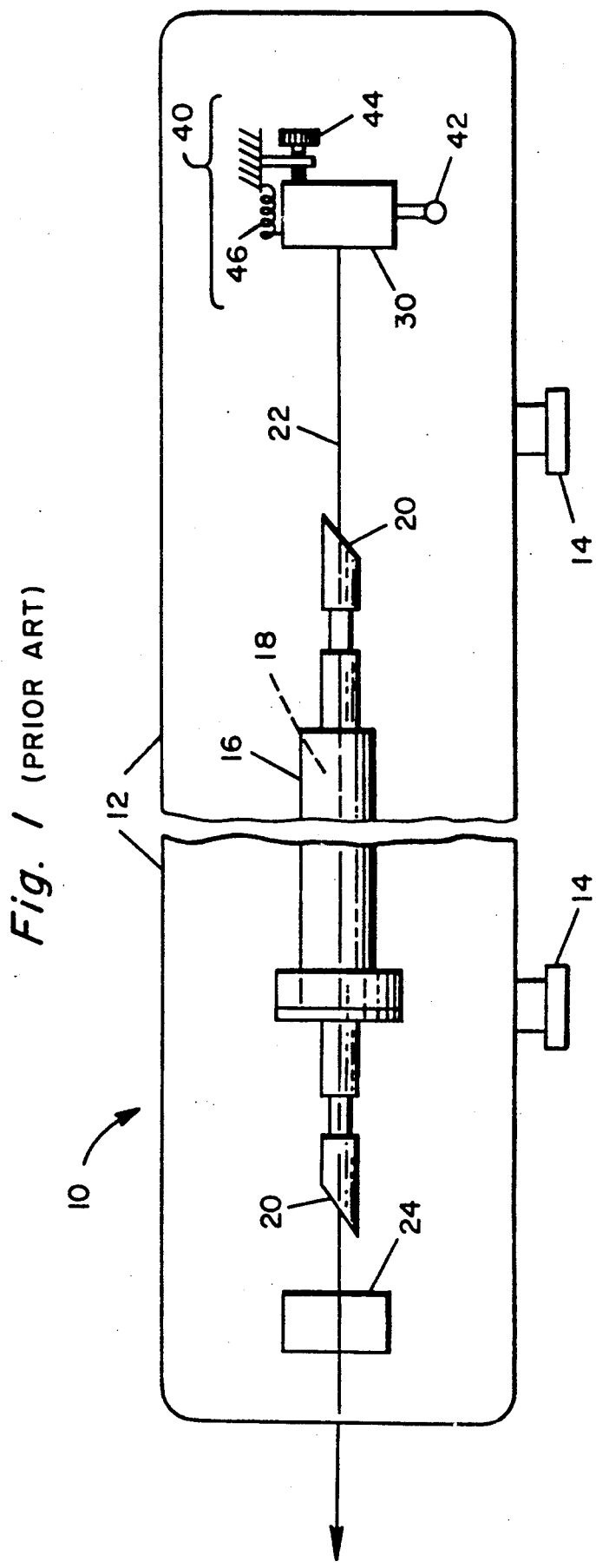
FIGS. 1-3, respectively, schematically illustrate prior art lasers providing a broad spectrum, a single line and a single frequency emission from the laser.

In FIG. 1, a prior art laser 10 comprises a housing 12 having shock mounts 14, a laser tube 16 containing the lasing medium 18 and front and back reflectors 24 and 30, respectively. The ends of the laser tube 16 are provided with Brewster angle windows 20 to eliminate reflections where the laser beam enters and leaves the tube 16. The back mirror 30 is provided with an alignment adjustment system 40 including a pivot mount 42, adjustment screws 44 (only one shown) for adjusting the alignment of the mirror with respect to the optical axis 22 and a biasing spring 46 for holding the mirror against the screw.

Mirror alignment systems normally have two separate adjustment screws; one for aligning the mirror with respect to a vertical axis, and one for aligning the mirror with respect to a horizontal axis in order that the normal to the mirror's surface may be aligned directly along the optical axis of the lasing media. Such adjustment systems (shown schematically here) are complex, carefully designed systems in order to minimize the transmission of vibrations to the mirror and to prevent changes in adjustment with changing temperature at the mirror mounts. It is important to prevent vibrations from reaching the mirror because even slight motion of the mirror can modulate the intensity of the laser output. The temperature compensation of the mounting system is to avoid a need to adjust the mounts as the laser heats up.

In order for the laser to emit its designed power of laser light, the mirrors 24 and 30 must each be aligned with the optical axis 22 of the laser tube 16. The adjustment screws 44 provide a means for performing this adjustment.

Figure 2:
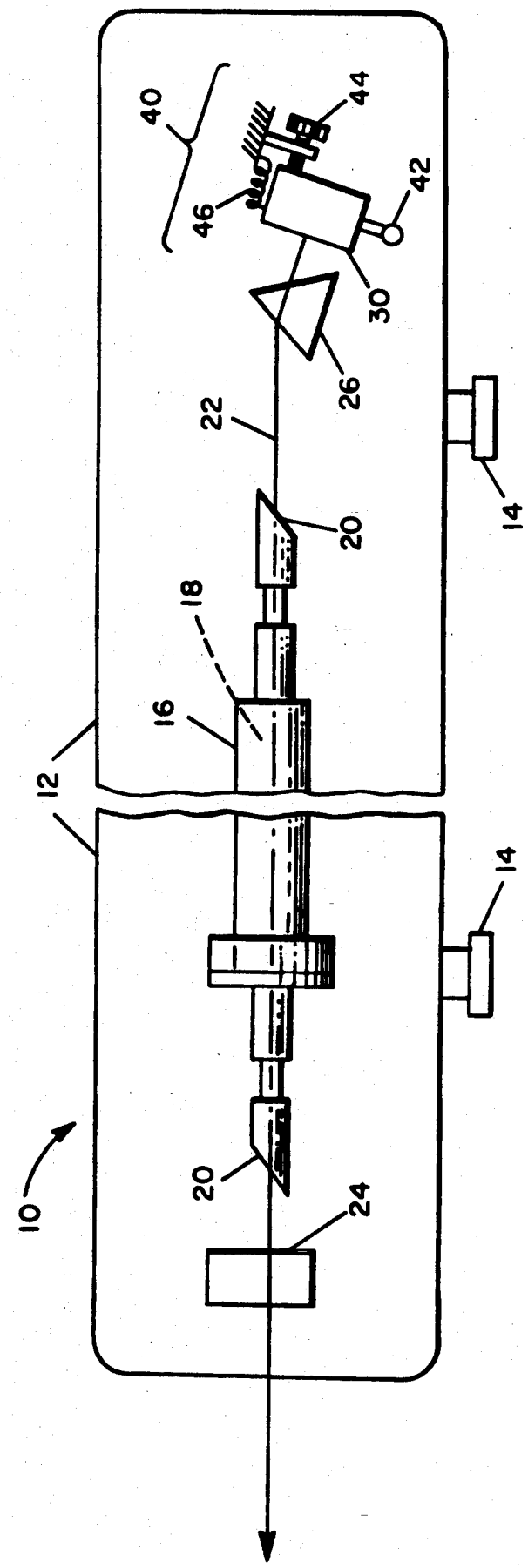
Figure 3:
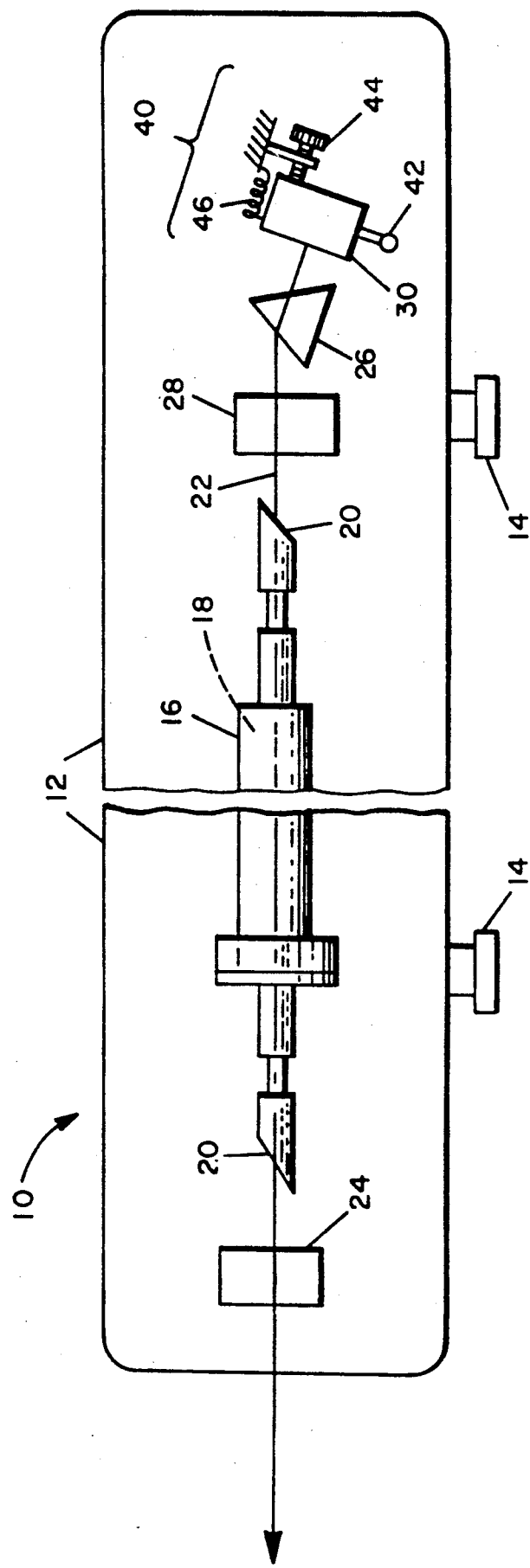

The prior art lasers illustrated in FIGS. 2 and 3 differ from that illustrated in FIG. 1 only in the presence of the prism 26 in FIG. 2 which converts the laser to single frequency operation and the further addition of an etalon 28 in FIG. 3 to convert the laser to single frequency operation. The manner and techniques for these conversions are well known in the laser art.

Figure 4:
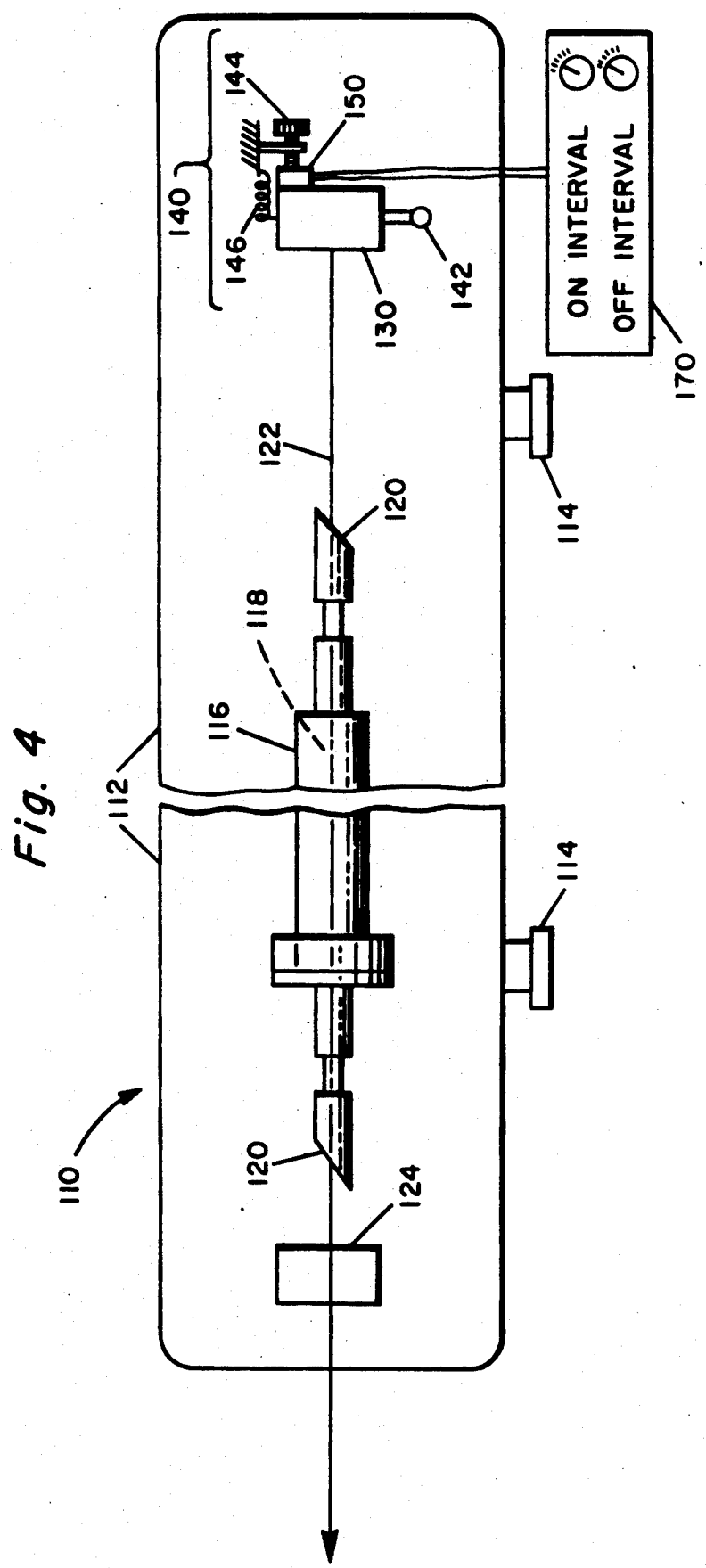
FIGS. 4-6, respectively, schematically illustrate broad spectrum, single line and single frequency lasers in accordance with the present invention.
Figure 5:
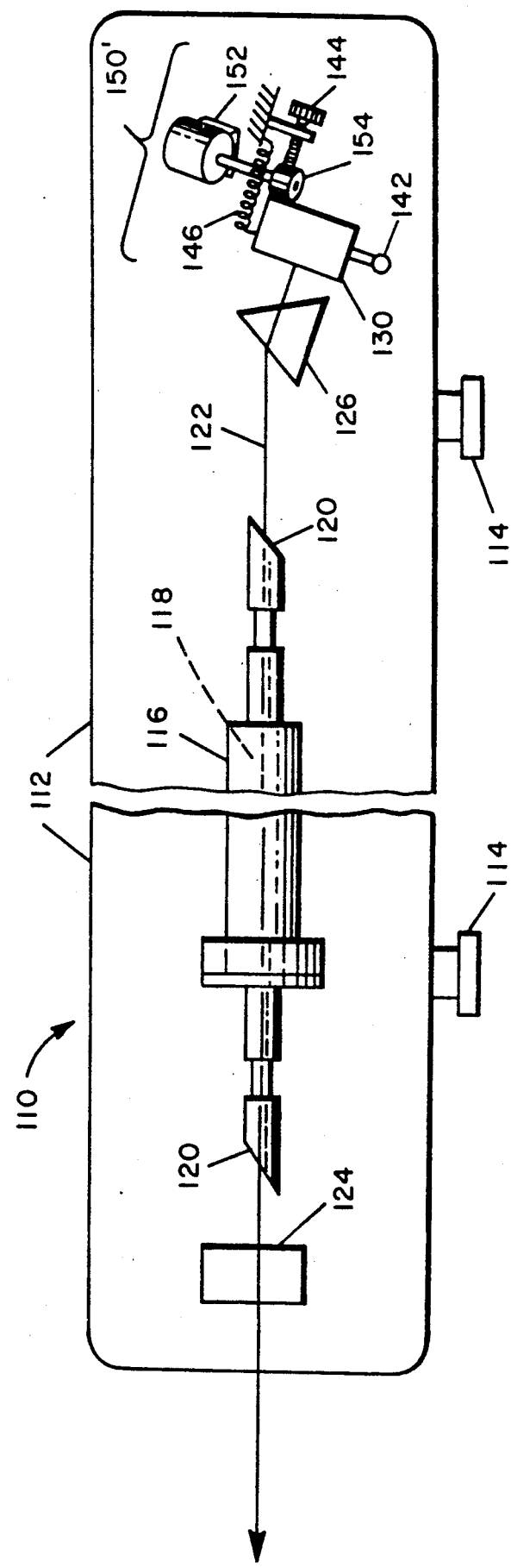
Figure 6:
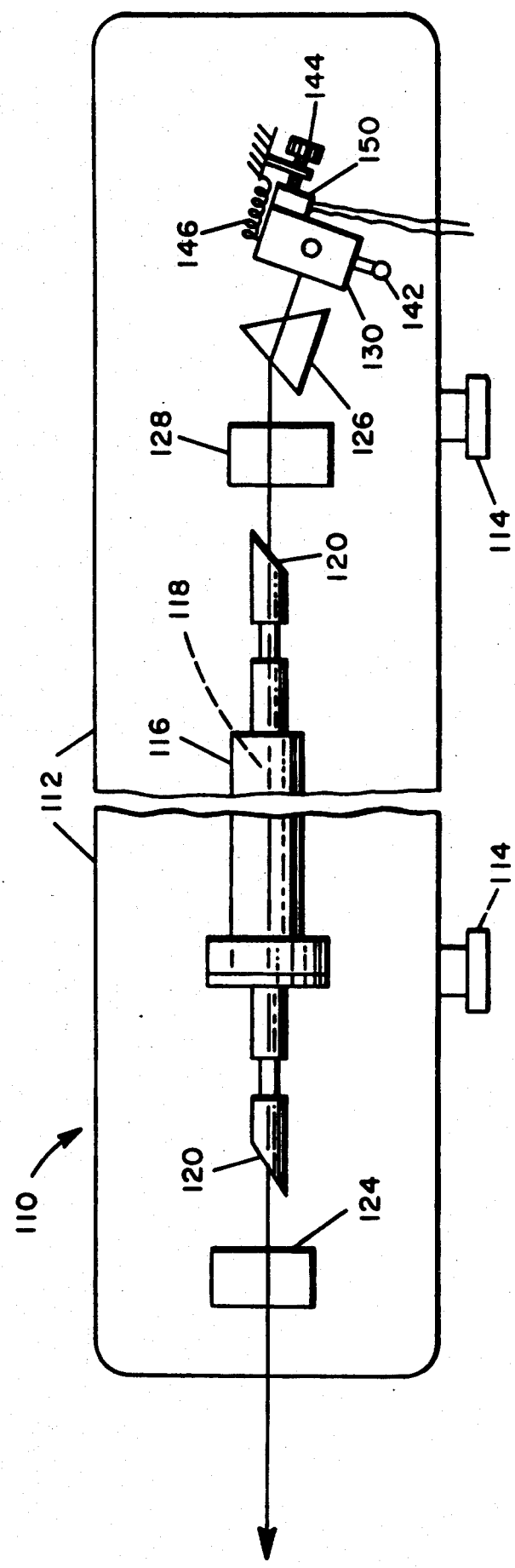

In FIG. 4, a switchable laser 110 in accordance with the present invention is illustrated. In FIG. 4, reference numerals in the 100s are used. Those reference numerals ending in the same two digits as the reference numerals in FIGS. 1-3 comprise similar structure and serve similar functions and may not be discussed in connection with FIG. 4 where there is no change in their function. The reader is referred to the earlier discussion of the corresponding elements in FIGS. 1-3 for the understanding of the function of those elements. In the laser 110, an electromagnetic transducer 150 is inserted in the mirror mount system 140 where it is effective for moving the mirror relative to the position established by the mechanical adjustment screw 144. The electromagnetic transducer 150 may be any one of a vast variety of different electromagnetic transducers and provides several significant improvements in the laser operation.

The transducer 150 is connected to a control system 70 which provides appropriate control signals to the transducer to cause the transducer to move the mirror to turn the laser on for selected intervals of time with a selected duty cycle. While this control system is illustrated as having separate controls for the "on interval" and the "off interval", this control system may have any of a wide variety of control variables and may be externally controlled or may be self contained. One simple form of this control system is a battery of appropriate voltage for driving the transducer, a solid state switch for connecting and disconnecting the circuit between the battery and the transducer and a source of a control signal for controlling the solid state switch. That source of a control signal may be as simple as an oscillator or may be microprocessor based, in accordance with the degree of sophistication and controllability which is desired in the particular system. This timing system may be in accordance with any appropriate one of the vast variety of well known timing systems. The selection of this timing system will depend on the particular application of the laser and the particular type of electromagnetic transducer employed. The drive signals may be merely on and off voltages or currents or may have specially tailored waveforms to provide specifically desired mechanical movement of the mirror without overshoot, ringing and so forth, again depending on the particular application and its specifications.

With the transducer 150 in its rest state, the adjustment screw 144 is adjusted to bring the mirror into proper alignment with the optical axis 122 of the laser system. This proper alignment may be determined in accordance with normal alignment determinations.

With the laser energized and the mirror in its properly aligned position, the laser will provide a continuous wave laser output. The laser output may be turned off by activating the electromagnetic transducer 150 to move the mirror sufficiently out of alignment (to misalign or disalign the mirror) to reduce the Q of the laser to less than about 100, or, depending on the Q of the laser by a factor of from 1,000 to 10,000 or so. The degree to which the Q of the laser must be reduced in order to turn it off 5 depends on the particular lasing medium and laser design. However, for each laser, there is a particular degree of misalignment which suppresses laser output. The fall time of the laser output during this turn-off is a function of the speed with which the electromagnetic transducer can move the mirror between its aligned position and a position which is more out of alignment than the threshold turn-off position. The laser output is turned back on by deactivating the electromagnetic transducer so that the mirror will return to its properly aligned position. The rise time of the laser light during the process of turning back on is again partially dependent on the mechanical speed of the mirror which is normally slower than the rise time which would result from inserting an opaque member between the mirror 130 and the laser tube 116 to prevent laser action and then removing the opaque member to turn the laser back on.

The transducer 150 may be a piezoelectric member which expands or contracts upon application of a DC voltage, a voice coil, a motor driven cam, a printer relay, a solenoid, an ultrasonic transducer or any other appropriate electromechanical transducer. The piezoelectric transducer, voice coil and similar transducers are considered preferable transducers because in their off-state in which the mirror is aligned with the optical axis, they induce no vibration which could modulate the laser beam. In contrast, in a motor-driven cam system in which the motor rotates continuously, vibrations may be transmitted to the mirror even when it is in its aligned state because of the continuing motion of the motor and cam.

Normally, an ion laser has a Q of at least 1,000 which means that laser light prior to emerging from the laser, traverses the laser tube 1,000 times by reflection from the end mirrors. As the end mirror is adjusted from in-alignment to out-of-alignment, the number of passes the light makes through the laser tube before diverging sufficiently that it no longer enters the laser tube, goes down rapidly. For a laser in which the mirrors are about 48 inches (122 cm) apart and in which the usable diameter of the laser tube is 1.5 mm, a rotation of between about 30° and about 60° of a 1,000:1 adjustment screw of the mirror mount reduces the Q of the laser enough to turn the laser off. The Spectra-Physics model 2030-5 laser is such a laser. Typically, for a Q less than about 100, an ion laser will not lase. Consequently, a rotation of micro radians is sufficient to turn the laser off and a very small movement of the electromagnetic transducer is sufficient to produce this degree of rotation of the mirror. Displacement of this size can be produced by many transducers. Printer relays, voice coils, piezoelectric transducers and ultrasonic transducers are capable of providing such displacement at signal frequencies up to about 60–100 KHz. The actual maximum switching frequency for a given laser depends on the mass which the transducer must move in order to misalign the mirror and in order to bring the mirror back into alignment.

The duty cycle of a laser switched in accordance with this invention is controllable in that the signal applied to the electromagnetic transducer need not be a sine wave or a symmetric square wave. Rather, application of a short pulse to the transducer will misalign the mirror for the duration of the pulse after which it will return to its aligned condition. Thus, the laser may be turned off briefly and then turned back on for an interval of whatever desired length. Similarly, applying a steady bias to the transducer which holds the mirror in its non-aligned condition and then removing that bias for a brief interval will allow the mirror to return to its aligned condition. This holds the laser normally off and turns it on for only the brief interval. Alternatively, one bias may be used to hold the laser off and a second bias applied to drive the mirror to its laser-on position. Two separate transducers may also be used.

This embodiment has been described in terms of turning on and off a CW laser whose normal output is a continuous laser beam as a means of producing a pulsed or switched laser having a controllable duty cycle and a potentially high repetition rate. However, this same technique is also applicable to the lasers whose lasing mechanism inherently or by design results in a pulsed output which largely depletes the lasing medium or excited states such that the laser has to recharge before it can deliver another pulse. That is, this mirror alignment switching can be used as a substitute for Q switches and other switching techniques in pulsed lasers.

This electronic adjustment of the mirror provides a further benefit in the laser system. By including an off-center detector in the system for detecting when the laser beam is off center, the transducers may be employed to maintain the laser mirrors in accurate alignment throughout the laser's operating cycle.

Figure 7:
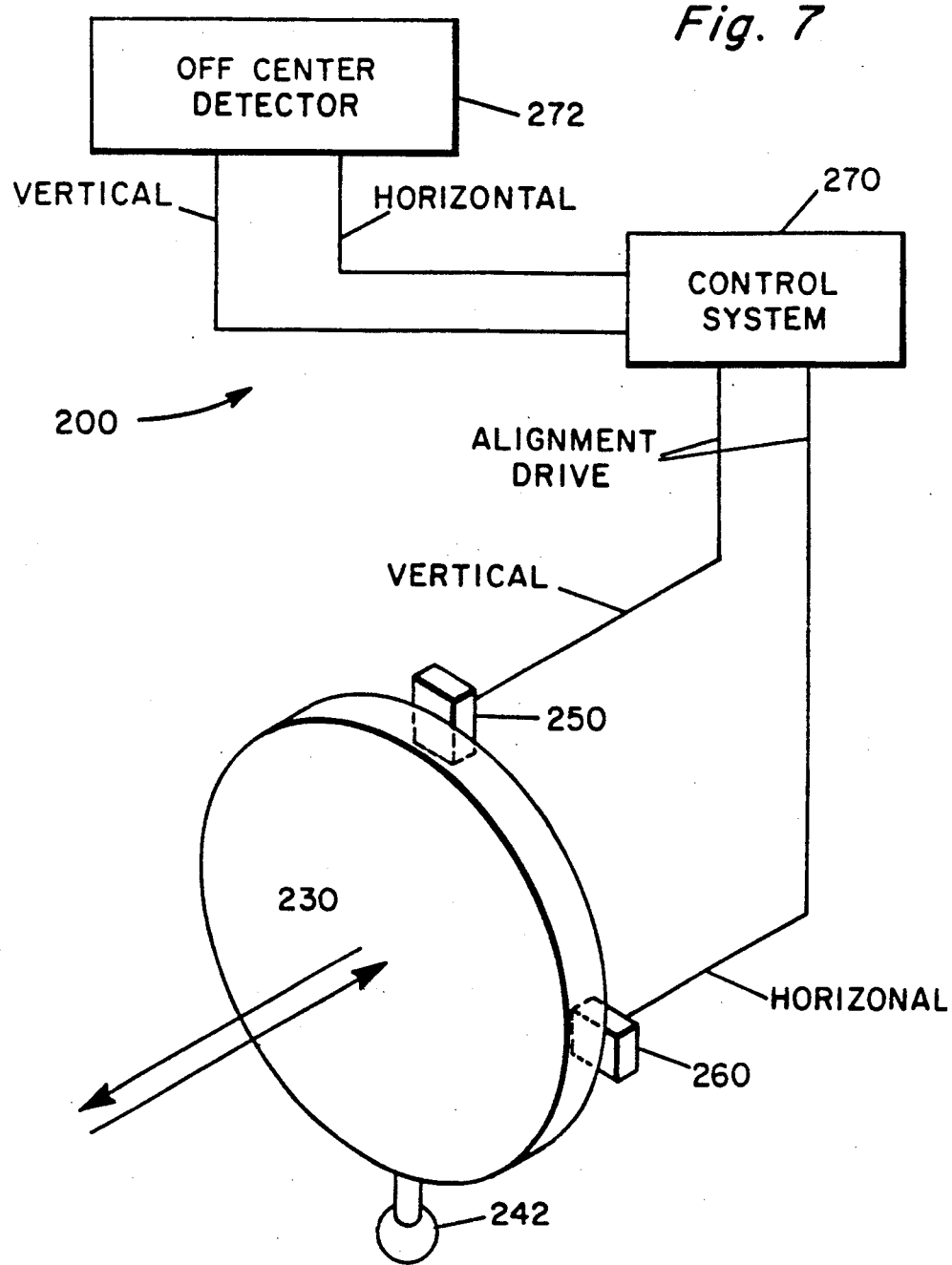
FIG. 7 is a schematic illustration of a control system for controlling the laser mirror's position.

A system 200 for electronically maintaining the alignment of the laser is illustrated in schematic block diagram form in FIG. 7. The system 200 comprises a control system 270, an off-center detector 272 and vertical and horizontal electromagnetic transducers 250 and 260, respectively, which adjust the mirror 230 on its pivot point 242 to maintain proper alignment of the mirror. Some commercially available lasers include off-center indicators to aid in manual alignment of the laser mirrors. While the laser is on, the signals applied to the transducers 250 and 260 may be kept constant so long as the off-center detector output indicates that the beam is on axis. If the off-center detector provides an output indicating that the beam is off axis in an upward vertical direction, the control system 270 responds to that signal by changing the signal applied to the vertical transducer 150 to bring the mirror slightly forward to return the beam to the axis. The "aligned" values for these transducer signals are preferably stored in the control system so that when the laser is turned off by application of a turn-off signal to one or both of the transducers, these same on-axis control signals may be applied to the transducers upon the removal of the turn-off signal so that the mirror will be accurately aligned when the laser turns back on.

If only electronic alignment control is desired without the ability to switch the laser on and off, then the timing portion of the control system 270 and the switching means for applying misalignment signals to the transducer may be omitted. That is, an electronic alignment-only system does not need the timing system for controlling the on and off intervals of the laser and the means to apply a signal to the transducer which will misalign the mirror to a non-lasing position.

Where switching of the laser at substantially higher frequencies is desired, such operation may be obtained by a variation on the already described embodiments in which an ultrasonic transducer is mounted on the mirror to induce acoustic waves along the surface of the mirror to locally change the plane of the mirror surface and thereby locally misalign the mirror surface and thereby interrupt the lasing action of the laser. The frequencies at which such switching is feasible and the duty cycle of that switching are controlled by the acoustic properties of the mirror and the transducers, since traveling waves induced in the mirror surface are only effective for misaligning the mirror during the period of time that a given rising or falling portion of the wave is propagating across the active portion of the mirror. Greater control may be provided by inducing standing waves. However, as the standing wave goes through zero, the mirror will come into alignment, thereby inducing lasing for the brief period before the standing wave increases to again deflect the mirror surface.

While the preferred embodiments of the present invention which have been described involve the use of a ion laser having mirrors external to the laser cavity, the techniques of this invention are also applicable to rod lasers having external mirrors and may be even applied to rod lasers having polished end surfaces which serve as the mirror for the laser by addition of an internal-reflection-frustrating surface adjacent the polished end. By controlling the spacing between the end face and that adjacent exterior surface to move that exterior surface between a position in which total internal reflection is frustrated and a position in which total internal reflection takes place, the laser may be turned off and on, respectively.

Further, the technique of this invention may be adapted to the provision of a shutter within the laser cavity for controlling the output of the laser. The use of shutters and aperture disks to control the output of a laser is known. Unfortunately, when such shutters are positioned external to the laser cavity, they must withstand the entire laser power for the entire time that the laser beam is interrupted. By placing the shutter or aperture within the laser cavity, the shutter or disk is only exposed to the full laser power at the instant it interrupts the laser beam since lasing then ceases until the shutter opens or the next aperture comes onto the optical axis of the cavity. Further, the shutter or disk surface may be provided with a mirror surface at an angle to the cavity axis to deflect the initial high power beam to an absorber designed to absorb that energy without damage within the cavity. While the peak power to be absorbed by that absorber is high, the average power is quite low because of the very brief duration of the laser light after interruption of the optical path within the cavity.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a laser of the type including a continuous lasing medium, an adjustable mirror which, when properly aligned with the optical axis of the lasing medium, enables laser action and means for continuously exciting said lasing medium, the improvement comprising:
   means for switching said laser between on and off states including:
   electromagnetic means for changing the angle of said mirror between an aligned condition in which laser action takes place and a misaligned condition in which laser action is suppressed.

2. The improvement recited in claim 1 wherein:
   said electromagnetic means for changing includes an electromechanical transducer for rotating the angle of said mirror relative to the optical axis of said laser in a first plane; and
   means for providing a control signal to said transducer.

3. The improvement recited in claim 2 wherein:
   said electromechanical transducer is a voice coil.

4. The improvement recited in claim 2 wherein:
   said electromechanical transducer is a relay.

5. The improvement recited in claim 2 wherein:
   said electromechanical transducer is an ultrasonic transducer.

6. The improvement recited in claim 2 wherein:
   said electromechanical transducer is a piezoelectric transducer.

7. The improvement recited in claim 3 wherein:
   said electromechanical transducer is a motor driven cam.

8. The improvement recited in claim 2 wherein:
   said electromagnetic means for changing includes a second electromechanical transducer for rotating the angle of said mirror relative to said optical axis in a second plane.

9. The improvement recited in claim 2 wherein said means for providing a control signal applies a drive signal to said transducer to place said laser in a selected one of its on-state and its off-state.

10. A switched laser comprising:
    an optical path having an optical axis and including first and second reflective surfaces;
    a continuous lasing medium disposed in said optical path;
    means for continuously exciting said lasing medium; and
    means for switching said first reflective surface into and out of a first state, reflecting light incident thereon from said optical axis along said optical path in a manner to enable laser light emission, and when not in said first state, not reflecting light incident thereon from said optical axis along said optical path in a manner which enables laser light emission.

11. The laser recited in claim 10 wherein:
    said first reflective surface is intended to be totally reflective.

12. The laser recited in claim 10 wherein:
    said means for switching comprises means for rotating said mirror relative to said optical axis.

13. A switched laser comprising:
    an optical path having an optical axis and including first and second reflective surfaces;
    a continuous lasing medium disposed in said optical path;
    means for continuously exciting said lasing medium; and
    means for switching said first reflective surface between first and second states, said first reflective surface when in said first state, reflecting light incident thereon from said optical axis along said optical path in a manner to enable laser light emission and when in said second state, not reflecting light incident thereon from said optical axis along said optical path in a manner which enables laser light emission.

14. A laser comprising
    an optical path including first and second reflective surfaces;
    a continuous lasing medium disposed in said optical path;
    means for continuously exciting said lasing medium;
    means for adjusting the alignment of said first reflective surface with respect to said optical path, said means for adjusting including an electromechanical transducer;
    means for detecting when said first reflective surface is properly aligned with said optical path; and
    a control system responsive to said means for detecting for providing drive signals to said electromagnetic transducer to maintain said first reflective surface in proper alignment with said optical path.

15. The laser recited in claim 14 wherein said control system further comprises:

means for providing drive signals to said electromagnetic transducer to misalign said first reflective surface to an extent that laser action is prevented.

16. A method of converting a continuous wave laser to pulsed laser comprising:

providing means for disaligning one of the laser's mirrors to interrupt the lasing action of said laser; and providing means for controlling the timing of the disalignment of said one of said laser's mirrors.

17. The method recited in claim 16 wherein:

said means for controlling controls said disalignment in a periodic manner to provide a constant pulse rate.

* * * * *